(12) United States Patent
Nabika et al.

(10) Patent No.: US 6,455,454 B1
(45) Date of Patent: *Sep. 24, 2002

(54) SEMICONDUCTOR CERAMIC, SEMICONDUCTOR CERAMIC ELEMENT AND CIRCUIT PROTECTION ELEMENT

(75) Inventors: Yasuhiro Nabika; Tetsukazu Okamoto, both of Omihachiman; Toshiharu Hirota, Hikone, all of (JP)

(73) Assignee: Murata Manufacturing Co. Ltd. (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/561,518

(22) Filed: Apr. 28, 2000

(30) Foreign Application Priority Data

Apr. 28, 1999 (JP) .......................................... 11-122505

(51) Int. Cl.$^7$ ............................................ C04B 35/468
(52) U.S. Cl. ...................... 501/136; 501/137; 501/138; 501/139; 252/519.12; 252/520.21
(58) Field of Search ................................ 501/136, 137, 501/138, 139; 252/519.12, 520.21

(56) References Cited

U.S. PATENT DOCUMENTS

| 4,483,933 A | * | 11/1984 | Kobayashi et al. | .......... 501/138 |
| 5,219,811 A | * | 6/1993 | Enomoto et al. | ........... 501/138 |
| 6,187,707 B1 | * | 2/2001 | Kahihara et al. | ........... 501/138 |

FOREIGN PATENT DOCUMENTS

| DE | 297531 | * | 1/1992 |
| JP | 03054165 | * | 3/1991 |
| JP | 05051254 | * | 3/1993 |

* cited by examiner

*Primary Examiner*—Karl Group
(74) *Attorney, Agent, or Firm*—Dickstein, Shapiro, Morin & Oshinsky, LLP.

(57) ABSTRACT

Provided is a semiconductor ceramic and a semiconductor ceramic element each having a room temperature specific resistance of 3 Ω·cm or lower and a resistance temperature characteristic of 9%/° C. or more. The semiconductor ceramic is characterized in that the ratio $R_1/(R_1+R_2)$, in which $R_1$ is the transgranular resistance value of the crystal particles and $R_2$ is the intergranular resistance value of the crystal particles and $R_1+R_2$ is the overall resistance value representing the sum of $R_1$ and $R_2$, is about 0.35 to 0.85.

15 Claims, 1 Drawing Sheet

SEMICONDUCTOR CERAMIC, SEMICONDUCTOR CERAMIC ELEMENT AND CIRCUIT PROTECTION ELEMENT

BACKGROUND OF THE INVENTION

1. Field of the Invention

The present invention relates to a semiconductor ceramic, in particular to a semiconductor ceramic and a semiconductor ceramic element each of which has a positive resistance temperature characteristic. This invention also relates to a circuit protection element formed by using the semiconductor ceramic element.

2. Description of the Related Art

Conventionally, a semiconductor element has been used to protect an electric circuit from being damaged by an overcurrent or has been used as a demagnetization element for a color television receiver. Such a semiconductor element is formed by providing electrodes on a semiconductor ceramic having a positive resistance temperature characteristic (hereinafter referred to as PTC characteristic) indicating that its resistance will suddenly become high as soon as its temperature arrives at the Curie temperature or higher. As a semiconductor ceramic for use in forming the semiconductor element, what has been used is a barium titanate ceramic whose specific resistance under room temperature is relatively small and whose resistance temperature coefficient is relatively large.

The barium titanate semiconductor ceramic is desired to have an improved resistance temperature characteristic. Further, it is desired to have a reduced specific resistance under the room temperature (hereinafter referred to as room temperature specific resistance) and to have an improved voltage proof characteristic. Accordingly, various researches have been conducted in order to satisfy these requirements.

For example, Japanese Unexamined Patent Application Publication No. 3-54165 has disclosed a barium titanate semiconductor ceramic which contains as its main components 45 to 87 mol % of $BaTiO_3$, 3 to 20 mol % of $PbTiO_3$, 5 to 20 mol % of $SrTiO_3$ and 5 to 15 mol % of $CaTiO_3$, and also contains as additives a semiconduction agent which is one substance selected from a group consisting of Sb, Bi, Nb, Ta and some rare earth elements, 0.2 to 0.5 mol % of Mn, and 0 to 0.45 mol % of $SiO_2$. By virtue of such a composition, the room temperature specific resistance may be controlled within a range of 3 to 10 $\Omega \cdot cm$.

Further, Japanese Unexamined Patent Application Publication No. 3-88770 has disclosed a semiconductor ceramic which contains as its main components 45 to 85 mol % of $BaTiO_3$, 1 to 20 mol % of $PbTiO_3$, 1 to 20 mol % of $SrTiO_3$ and 5 to 20 mol % of $CaTiO_3$, and also contains as additives 0.1 to 0.3 mol % of a semiconduction agent, 0.006 to 0.025 mol % of Mn and 0.1 to 1 mol % of $SiO_2$. By using such a composition and by adjusting the particle diameter of the mixture, its room temperature specific resistance may be controlled within a range of 4 to 8 $\Omega \cdot cm$, and a gradient of a resistance temperature characteristic may be kept at 9%/° C. or higher.

Moreover, Japanese Unexamined Patent Application Publication No. 9-22801 has taught that if the percentage of the intergranular resistance value occupying an overall resistance value consisting of the intergranular resistance value and the transgranular resistance value of the semiconductor ceramic crystal particles is controlled at 20% or lower, it is possible to improve the voltage proof characteristic of the semiconductor ceramic.

The commercial market in the field of the present invention has an increasingly high demand with respect to the semiconductor ceramic having PTC characteristic, which is to further improve its resistance temperature characteristic, to further reduce its room temperature specific resistance and to further improve its voltage proof characteristic. In particular, it has been desired that the semiconductor ceramic for use in forming circuit protection should have a lower specific resistance at the room temperature in order to reduce electric power consumption.

SUMMARY OF THE INVENTION

It is an object of the present invention to provide a semiconductor ceramic and a semiconductor ceramic element having a room temperature specific resistance of 3 $\Omega \cdot cm$ or lower and having a resistance temperature characteristic of 9%/° C. or more.

The present invention has been accomplished in view of the above object.

A semiconductor ceramic according to a first aspect of the present invention has a positive resistance temperature coefficient characterized in that the ratio $R_1/(R_1+R_2)$, in which $R_1$ is the transgranular resistance value of the crystal particles and $R_2$ is the intergranular resistance value of the crystal particles and $R_1+R_2$ is the overall resistance value representing the sum of $R_1$ and $R_2$ is about 0.35 to 0.85.

By forming the above ratio of the transgranular resistance value to the overall resistance value, it is possible to obtain a semiconductor ceramic element having a room temperature specific resistance of 3 $\Omega \cdot cm$ or lower and having a resistance temperature characteristic of 9%/° C. or more.

Further, a semiconductor ceramic according to a second aspect of the present invention is characterized in that the crystal particles are referred to contain barium titanate as its main component. By forming the above composition, it is possible to obtain a semiconductor ceramic having an excellent PTC characteristic.

Moreover, a semiconductor ceramic element according to a third aspect of the present invention is characterized in that it is formed by providing electrodes on a semiconductor ceramic obtained according to the first or second aspect of the present invention.

Further, a circuit protection element made according to a fourth aspect of the present invention is preferred to be formed by using a semiconductor ceramic according to the third aspect of the present invention.

By using the semiconductor ceramic in this manner, one can more effectively utilize the semiconductor ceramic element of the present invention having a low specific resistance under a room temperature.

DESCRIPTION OF THE PREFERRED EMBODIMENTS

Figure 1:
FIG. 1 is a generally perspective view schematically indicating a semiconductor ceramic made according to the present invention.

A semiconductor ceramic according to the present invention is so formed that the ratio $R_1/(R_1+R2)$, in which $R_1$ is the transgranular resistance value of the crystal particles and $R_2$ is the intergranular resistance value of the crystal particles and $R_1+R_2$ is the overall resistance value representing the sum of $R_1$ and $R_2$ is about 0.35 to 0.85.

Although the composition of the above semiconductor ceramic does not have to be limited to particular ranges, it is preferred to use a semiconductor ceramic whose main component contains $BaTiO_3$ since such composition can provide an excellent PTC characteristic. A main component comprising $BaTiO_3$ can further contain, besides $BaTiO_3$, other substances including $PbTiO_3$, $SrTiO_3$ and $CaTiO_3$. Moreover, it is preferred that the above main components be used such that $BaTiO_3$ is about 30 to 97 mol %, $PbTiO_3$ is about 1 to 50 mol %, $SrTiO_3$ is about 1 to 30 mol %, and $CaTiO_3$ is about 1 to 25 mol % (100 mol % total).

In addition, the semiconductor ceramic can contain, besides the above main components, some accessory components including a semiconduction agent which is one substance selected from a group consisting of La, Sb, Nb, Y and rare earth elements, and/or some oxidizing agents such as Si and Mn. As a semiconduction agent, it is preferred to use $Sm_2O_3$ whose room temperature specific resistance differs little from one lot to another and whose room temperature specific resistance may be made small.

The above overall resistance is a sum of a transgranular resistance value ($R_1$) and an intergranular resistance value ($R_2$). Namely, transgranular resistance value/overall resistance=transgranular resistance value/(transgranular resistance value+intergranular resistance value)=$R_1/(R_1+R_2)$ In the following, the semiconductor ceramic of the present invention will be described in more detail with the use of the following example.

EXAMPLE

As starting raw materials serving as the main components, several substances were obtained by providing the weights thereof so that $BaCO_3$ was 60 mols, PbO was 10 mols, $SrCO_3$ was 15 mols, $CaCO_3$ was 15 mols and $TiO_2$ was 100 mols. Further, accessary starting raw materials were obtained by providing the weights thereof so that $Sm_2O_3$ serving as a semiconduction agent was 0.1 mol, $MnCO_3$ serving as an additive was 0.02 mol and $SiO_2$ serving as another additive was 1 mol.

The above raw materials were mixed together and were subjected to a wet mixing treatment for 5 hours with the use of a ball mill. Afterwards, the mixed raw materials were dehydrated and dried so as to be formed into a solid mixture. The obtained mixture was pre-sintered for 2 hours under a temperature of 1150° C. Subsequently, a binder was added into the mixture which was then subjected to a granulating treatment so as to be formed into predetermined granulated particles. After that, the granulated particles were subjected to a pressing treatment under a condition of 1.5 ton/cm² so that they were formed into a number of circular plates each having a thickness of 4.0 mm, and a diameter of 9.0 mm. The obtained circular plates were then sintered for one hour at a temperature of 1350° C. At this moment, the oxidizing condition was changed within a temperature range of 1150 to 1250° C., so that ratios of transgranular resistance value/overall resistance value became those indicated in Table 1, thereby obtaining a desired semiconductor ceramic. Here, the oxidizing condition means the sintering temperature and the oxygen partial pressure. However, the conditions may be properly selected in accordance with the size of sintered ceramic and the structure of the furnace used in the sintering treatment.

Then, as shown in FIG. 1, two main surfaces of a semiconductor ceramic 3 were coated with an In-Ga electrode paste. In this way, a pair of surface electrodes 5 were formed in a manner shown in the drawing, thereby forming a semiconductor ceramic element 1.

Afterwards, a measurement was carried out to measure the room temperature specific resistance ($\rho_{25}$) and the resistance temperature coefficient ($\alpha$) of the semiconductor ceramic element. Further, another measurement was conducted on the semiconductor ceramic so as to measure the transgranular resistance value ($R_1$), the intergranular resistance value ($R_2$) and the overall resistance value ($R_1+R_2$) of the crystal particles. The transgranular resistance value ($R_1$) and the intergranular resistance value ($R_2$) were measured with the use of a complex impedance method.

Figure 2:
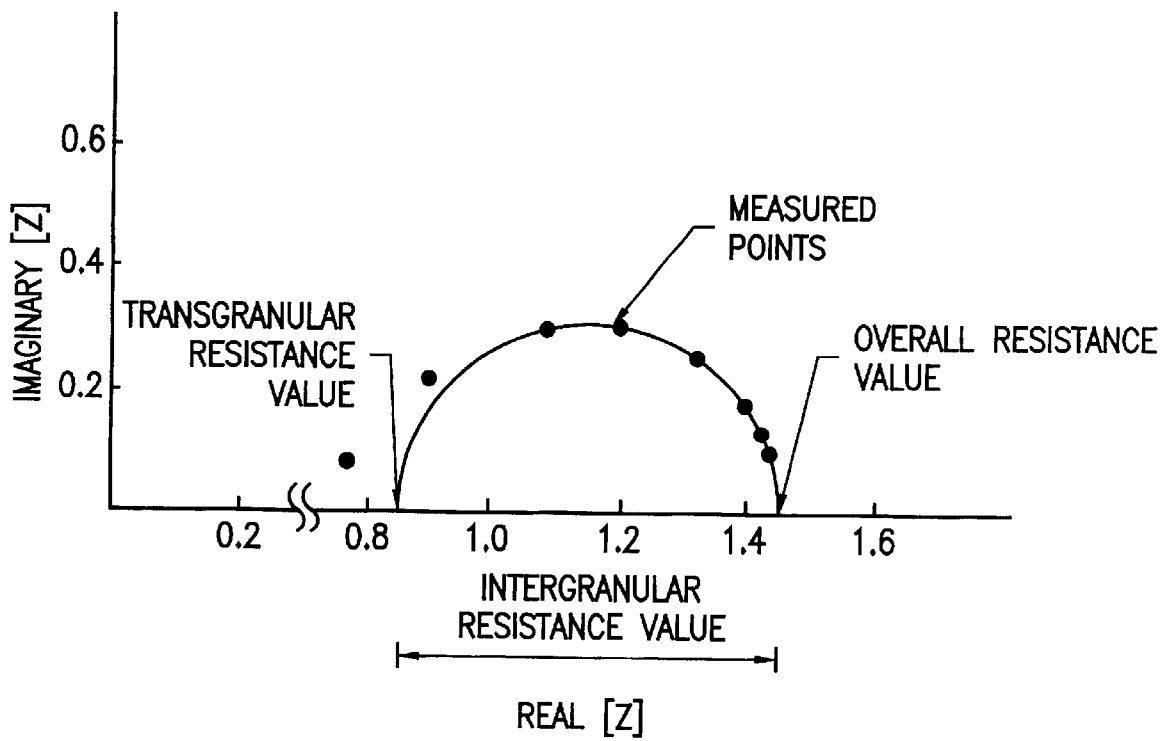
FIG. 2 is a graph indicating an example in which various resistance values are measured with the use of a method called the complex impedance method.

Next a detailed description will be given to the method for measuring the transgranular resistance value and the intergranular resistance value with the use of the complex impedance method. In practice, an impedance analyzer was used and the measurement was carried out at a number of values in a frequency band from 100 MHZ to 30 MHZ, thereby obtaining measured points as shown in FIG. 2. These measured points were then connected by a circular arc line shown in FIG. 2 so as to obtain the transgranular resistance value and the overall resistance value. In the process of preparing the graph, the right portion of the circular arc has been so drawn that to keep a high coincidence of these measured points. The left portion of the circular arc has been so drawn that the measured points do not corresponding to the right portion of the circular arc. In other words, the arc for the higher half of the measured points was drawn as coincident as possible and then extended to the axis using the same radius without regard to the degree of coincidence with the lower half of the measured point values. In this way, the graph shown in FIG. 2 can be used to indicate that the point 0.84 Ω is the transgranular resistance value ($R_1$), the point 1.45 Ω is the overall resistance value ($R_1+R_2$), and the difference between the overall resistance value ($R_1+R_2$) and the transgranular resistance value ($R_1$), i.e., the difference (1.45 Ω–0.84 Ω=0.61 Ω) is the intergranular resistance value ($R_2$). In this way, one can calculate the ratio of transgranular resistance value to overall resistance value ($R_1/(R_1+R_2)$) from the transgranular resistance value ($R_1$) and the intergranular resistance value ($R_2$). The calculated results are shown in Table 1. In Table 1, marks * are used to represent data not falling within the scope of the present invention.

TABLE 1

| Sample Number | Transgranular Resistance Value Ω | Intergranular Resistance Value Ω | Overall Resistance Value Ω | Ratio of Intergranular Resistance Value/Overall Resistance Value | Room Temperature Specific Resistance (Ω.cm) | Resistance Temperature Characteristic (%/° C.) | Sintering Atmosphere |
|---|---|---|---|---|---|---|---|
| *1 | 0.74 | 1.64 | 2.38 | 0.31 | 3.8 | 12.1 | Ambient |
| 2 | 0.7 | 1.19 | 1.89 | 0.37 | 3.0 | 12.8 | $N_2 + O_2$ |
| 3 | 0.75 | 0.82 | 1.57 | 0.48 | 2.5 | 11.8 | $N_2 + O_2$ |
| 4 | 0.82 | 0.82 | 1.64 | 0.50 | 2.6 | 10.7 | $N_2 + O_2$ |
| 5 | 0.79 | 0.72 | 1.51 | 0.52 | 2.4 | 10.9 | $H_2/N_2 + O_2$ |
| 6 | 0.93 | 0.71 | 1.64 | 0.57 | 2.6 | 12.5 | $N_2 + O_2$ |
| 7 | 0.88 | 0.63 | 1.51 | 0.58 | 2.4 | 10.8 | $N_2 + O_2$ |
| 8 | 0.84 | 0.61 | 1.45 | 0.58 | 2.3 | 11.1 | $H_2/N_2 + O_2$ |
| 9 | 0.84 | 0.54 | 1.38 | 0.61 | 2.2 | 11.4 | $N_2 + O_2$ |
| 10 | 0.95 | 0.56 | 1.51 | 0.63 | 2.4 | 11.9 | $N_2 + O_2$ |
| 11 | 0.88 | 0.33 | 1.19 | 0.72 | 1.9 | 10.8 | $H_2/N_2 + O_2$ |
| 12 | 0.84 | 0.29 | 1.13 | 0.74 | 1.8 | 9.9 | $N_2 + O_2$ |
| 13 | 0.77 | 0.17 | 0.94 | 0.82 | 1.5 | 9.1 | $H_2/N_2 + O_2$ |
| *14 | 0.55 | 0.08 | 0.63 | 0.88 | 1.0 | 2.9 | $N_2$ |

As shown in Table 1, the semiconductor ceramic of the present invention has a room temperature specific resistance of 3.0 Ω·cm or lower and a resistance temperature characteristic of 9%/° C. or more.

The reason why the ratio of transgranular resistance value to overall resistance value ($R_1/(R_1+R_2)$) should be limited within a range of about 0.35 to 0.85, may be explained as follows. As shown in a case of sample number 1, if the ratio ($R_1/(R_1+R_2)$) is less than about 0.35, the resistance temperature coefficient will be as high as 12.1%/° C., but the room temperature specific resistance will undesirably become higher than 3 Ω·cm. On the other hand, as shown in a case of sample number 14, if the ratio ($R_1/(R_1+R_2)$) is larger than about 0.85, the room temperature specific resistance will be as small as 1.0 Ω·cm, but the resistance temperature coefficient will undesirably become greatly smaller than 9%/° C.

The semiconductor ceramic of the present invention is a semiconductor ceramic having a positive resistance temperature coefficient. In particular, the ratio of $R_1/(R_1+R_2)$, in which $R_1$ is the transgranular resistance value of the crystal particles and $R_2$ is the intergranular resistance value of the crystal particles and $R_1+R_2$ is the overall resistance value representing the sum of $R_1$ and $R_2$, is about 0.35 to 0.85. Therefore, it is possible to ensure that its room temperature specific resistance is 3 Ω·cm or lower and its resistance temperature characteristic is 9%/° C. or more.

Further, by forming the above crystal particles containing barium titanate as its main component, it is possible to obtain a semiconductor ceramic having an excellent PTC characteristic.

Moreover, a semiconductor ceramic element of the present invention is formed by providing electrodes on the above semiconductor ceramic. In addition, since the above semiconductor ceramic element may be used to protect an electric circuit, one can more effectively utilize the semiconductor ceramic element of the present invention having a low room temperature resistance.

What is claimed is:

1. A semiconductor ceramic having a positive resistance temperature coefficient, characterized in that the ratio of $R_1/(R_1+R_2)$, in which $R_1$ is the transgranular resistance value of the crystal particles and $R_2$ is the intergranular resistance value of the crystal particles and $R_1+R_2$ is the overall resistance value representing the sum of $R_1$ and $R_2$, is about 0.48 to 0.85.

2. The semiconductor ceramic according to claim 1, wherein the ceramic comprises barium titanate.

3. The semiconductor ceramic according to claim 2, wherein the ceramic comprises about 30 to 97 mol % $BaTiO_3$, about 1 to 50 mol % $PbTiO_3$, about 1 to 30 mol % $SrTiO_3$ and about 1 to 25 mol % $CaTiO_3$.

4. The semiconductor ceramic according to claim 3, wherein the ceramic additionally comprises a semiconduction agent or an oxidizing agent or both.

5. The semiconductor ceramic according to claim 3, wherein the ton ceramic additionally comprises $Sm_2O_3$.

6. A semiconductor ceramic element characterized in that it comprises a pair of electrodes and a semiconductor ceramic according to claim 5.

7. A semiconductor ceramic element characterized in that it comprises a pair of electrodes and a semiconductor ceramic according to claim 4.

8. A semiconductor ceramic element characterized in that it comprises a pair of electrodes and a semiconductor ceramic according to claim 3.

9. A semiconductor ceramic element characterized in that it comprises a pair of electrodes and a semiconductor ceramic according to claim 2.

10. A semiconductor ceramic element characterized in that it comprises a pair of electrodes and a semiconductor ceramic according to claim 1.

11. In a circuit protection element containing a semiconductor ceramic element, the improvement in which the semiconductor ceramic element is a semiconductor ceramic element according to claim 10.

12. In a circuit protection element containing a semiconductor ceramic element, the improvement in which the semiconductor ceramic element is a semiconductor ceramic element according to claim 9.

13. In a circuit protection element containing a semiconductor ceramic element, the improvement in which the semiconductor ceramic element is a semiconductor ceramic element according to claim 8.

14. In a circuit protection element containing a semiconductor ceramic element, the improvement in which the semiconductor ceramic element is a semiconductor ceramic element according to claim 7.

15. In a circuit protection element containing a semiconductor ceramic element, the improvement in which the semiconductor ceramic element is a semiconductor ceramic element according to claim 6.

* * * * *